3,240,579
PAPER SATURATED WITH RESINOUS POLYMER
Arthur H. Ahlbrecht, Mahtomedi, Minn., assignor to Minnesota Mining and Manufacturing Company, St. Paul, Minn., a corporation of Delaware
No Drawing. Filed Jan. 4, 1960, Ser. No. 6
4 Claims. (Cl. 51—298)

This invention relates to saturated paper which has extremely high wet tensile strength and which is useful for waterproof sandpaper backing, masking tape, etc. It also relates to coated products having saturated paper as a backing.

The saturated paper products of this invention are economical to manufacture, and the product made with a given saturant and paper has predictable and accurately reproducible characteristics of strength, flexibility, porosity, "hand," receptivity to ink and graphite, etc. Contact between the fibers and the saturant is so intimate that the finished product is often highly translucent and may be used as a durable tracing film, transparent labeling tape, etc. The saturated products can endure extremely high temperatures, e.g., as high as 350° F., for several hours without embrittling, becoming thermoplastic, or otherwise losing strength; thus saturated creped papers are useful as backings for pressure-sensitive adhesive tape used to mask areas from undesired paint spray in automobile plants, where the paint is cured at high temperatures and the tape removed while the painted surface is still extremely hot. The saturated paper products of this invention can be converted into tape by providing them with suitable normally tacky and pressure-sensitive adhesive coatings, desirably employing suitable primers and low-adhesion backsizes, in accordance with well-known techniques, e.g., as set forth in Abere, Schmelzle and Murray, U.S. Patent No. 2,725,981. The saturated papers of my invention are strong, flexible, and tear-resistant, and they retain these characteristics to a high degree after being soaked in water; thus, an especially important application is as the backing for waterproof sandpaper, which may be used either wet or dry under a wide range of temperatures.

The materials used to produce the saturated backing of this invention have the combined advantages of low viscosity, high solubility in common organic solvents, and stability at room temperature even under highly humid atmospheric conditions. Because of the low viscosity of the saturants, I am able to take advantage of relatively non-porous paper backings which have inherently high dry strength but which have not previously been usefully saturable; thus, I am able to employ relatively lesser amounts of saturant than is required with conventional saturating papers to produce firm, flexible products having extremely good wet and dry strength. On the other hand, I am able to apply sufficient saturant to conventional saturating paper in a single operation to produce strong products without either disintegrating the paper during treatment or coating a thick layer on the surface.

The saturated paper of my invention is made by introducing into the backing of a water-laid sheet of fibers a first organic compound in liquid form having at least about two alkylene amido rings per molecule and a second organic compound in liquid form having at least about two reactive hydrogen-bearing groups per molecule, and subsequently reacting the two compounds in situ to form a flexible tackfree solid resinous saturant polymer which exists throughout the cellulosic sheet, intimately contacting and binding the fibers thereof firmly together. The compounds may be normally liquid, or they may be fused or in solution at the time they are introduced into the sheet.

The concept of saturating a water-laid sheet of cellulosic fibers to impart water-resistance, tear strength, etc., has been known for many years. Such paper sheets are often saturated with a latex, emulsion, or aqueous dispersion of the desired polymer, typically containing about 40% solids. Because such polymer emulsions inherently contain molecules of relatively high molecular weight (on the order of at least several hundred thousand) the paper ordinarily used is porous, open, relatively weak, and therefore extremely hard to handle on the saturating equipment. In order to achieve a high degree of strength it is necessary to employ a relatively large amount of saturant, but even when this is done, the contact between the fibers and the polymer molecules is not intimate unless the saturated paper is heated to a relatively high temperature, a procedure which is likely to degrade the cellulose fibers themselves. Further, the inevitable presence of an emulsifying agent in the latex tends to reduce the waterproofness of the saturated paper.

Because of the aforementioned disadvantage of latex saturation, there have been numerous attempts to saturate paper backings with organic solutions of high molecular weight polymers having the desired characteristics. It is extremely difficult, if not impossible, to attain solutions of desirable polymers which have a useful viscosity, e.g., not more than about 500 centipoises at room temperature, if the treating solution contains as much as 20% solids. Under these conditions several treatments are required to achieve the desired degree of saturation, and, as is the case with latex molecules, it is difficult to achieve intimate contact between the large polymer molecules and the fibers throughout the sheet. It might be supposed that a more concentrated solution of a low molecular weight polymer such as polyisobutylene, polybutadiene, butadiene-acrylonitrile copolymer, or butadiene-styrene copolymer could be employed to saturate the backing and subsequently vulcanized or crosslinked to a higher molecular weight, but crosslinking of such polymers to yield usable products is controlled only with great difficulty.

It has been recognized that if materials which react to form high molecular weight rubber-like polymer chains could be introduced into a paper backing and subsequently reacted, the disadvantages of previous saturating techniques might be overcome. Thus, it is known to introduce di- or polyisocyanates and polyesters or similar resins into paper backings and react them to form an elastomer in situ. Isocyanates, however, are notoriously difficult to work with, since they tend to react with cellulose, with bound water attached to the cellulose molecules, and even with atmospheric moisture. As a result, saturated cellulosic paper products made in this manner are quite unpredictable as to their final properties.

I have now been able to prepare saturated paper which overcomes all the disadvantages listed above in that it employs low viscosity materials which can be predictably reacted in a paper backing, even under widely varying atmospheric conditions, to form a strong, tough, water-resistant product in which the fibers have not been degraded by heat. As co-reactants I employ a first organic material having at least about two 1,2-alkylene amido rings per molecule and a second material having at least about two reactive hydrogen-bearing groups (reactive hydrogen being determinable by the Zerevitinov method) per molecule. A 1,2-alkylene amido ring, of course, contains the aziridine ring,

united to a substituted or unsubstituted radical of acid character, e.g., united to a

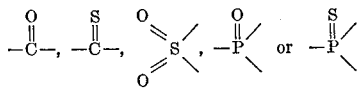

radical. Characteristic reactive hydrogen-bearing groups include —COOH, —OH, —SH, and —NH$_2$. In order to maintain flexibility in my final saturated paper product, I employ materials in which the equivalent weight of the second material is at least about 100 times, and preferably at least about 200 times, the number of active hydrogen-bearing groups per molecule. The ratio of the total number of 1,2-alkylene amido rings provided by the first material to the total number of molecules of the second material is preferably at least about 2:1, while the ratio of the total number of 1,2-alkylene amido rings provided by the first material to the total number of active hydrogen-bearing groups provided by the second material is preferably not more than about 2:1.

Suitable polyamido compounds in which the aziridine ring is united to a

group include polyalkylene amide such as

N,N'-bisethylenadipamide;
N,N'-bisethylenisosebacamide;
N,N'-bis-1,2-butylenisosebacamide;
N,N'-bis-ethylensebacamide;
N,N'-bis-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-ethylendodecanedicarboxylic acid amide;
N,N'-bis-ethylenetradecanedicarboxylic acid amide;
N,N'-bis-1,2-propylentetradecanedicarboxylic acid amide;
N,N'-bis-ethylenhexadecanedicarboxylic acid amide;
N,N'-bis-ethylenoctadecanedicarboxylic acid amide;
N,N'-bis-1,2-propylenoctadecanedicarboxylic acid amide;
N,N'-bis-1,2-propylendodecanedicarboxylic acid amide;
N,N'-bis-1,2-pentylensebacamide;
N,N'-bis-1,2-pentadecylene adipamide;
N,N'-bis-1,2-butylenisophthalamide;
N,N'-bis-1,2-propylenisophthalamide;
N,N',N'' tris-ethylene trimesamide;
N,N',N'' tris-1,2-propylene trimesamide;
N,N'-bis-1,2-pentylenisophthalamide;
N,N'-bis-ethylenterephthalamide;
N,N'-bis-1,2-propylenterephthalamide;
N,N'-bis-1,2-butylenterephthalamide;
N,N'-bis-ethylenisophthalamide, etc.

Polyalkylene amides of the type described above may be prepared in monomeric form by the following process: a 1,2-alkylenimine, desirably containing not more 6 carbon atoms, such as ethylenimine, 1,2-propylenimine, 1,2-butylenimine, 1,2-pentylenimine, etc., is reacted in the presence of an acid acceptor with an aliphatic dicarboxylic acid chloride, preferably containing 6 to 36 carbon atoms (e.g., isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride, isophthaloyl chloride or terephthaloyl dichloride) to produce the desired substantially pure N,N'-bis-1,2-alkylenamide monomer. The 1,2-alkylenimine is employed in a ratio of about 2 moles for each mole of acid chloride. Advantageously, an excess of 1,2-alkylenimine, such as about 5% by weight, over and above this ratio may be employed, although an excess of up to about 25% may be employed.

Desirably, the 1,2-alkylenimine is introduced in an aqueous solution which also contains an alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than two carbon atoms, is employed, an alkali-metal bicarbonate, such as sodium, potassium, or lithium bicarbonate may be used as the acid-acceptor instead of a carbonate. This aqueous solution is intimately mixed with the carboxylic acid chloride dissolved in a substantially water-immiscible organic solvent which is chemically inert to both the reactants and the reaction products and in which the resulting N,N'-bis-1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the alkylenimide product by hydrogen chloride formed during the course of the reaction is effectively minimized. Polyalkylene amides made in this way have at least about 85% of the theoretical number of amido rings and contain less than about 1% free chloride. This high degree of purity is a desirable feature in making the article of my invention, but substantially less pure materials may be used in most cases.

Other useful polyamido compounds in which the

ring is united to a

group include polyethylene ureas made by the addition of an alkylene imine to a polyisocyanate, as disclosed in Bestian U.S. Patents 2,302,288 and 2,327,760 and Orthner et al. U.S. Patent 2,390,165. Still other polyamido compounds in which the aziridine rings are united to carbonyl radicals include polycarbamates, such as 2,2-bis-p-(β-N-β-ethylene carbamato-β-methyl phenetyl) propane, and 2,2-bis-p-(N-ethylene carbamato phenetyl) propane.

Useful polyamido ring compounds in which the aziridine ring is united to an

group include those made by reacting a polysulfonyl chloride with an alkylene imine in the presence of an acid acceptor to yield products such as N,N'-bisethylene metabenzenesulfonamide. A satisfactory process for making 1,2-alkylene disulfonamides is described in German Patent 740,723, issued October 27, 1943.

Useful polyamido ring compounds in which the aziridine ring is united to a

radical include N-substituted N',N''-diethylenephosphonic acid as disclosed in Parker et al., U.S. Patent 2,663,705; phosphoric acid triamides and derivatives thereof (G. M. Kosolopoff, Organo-Phosphorous Compounds, 1950, pages 312–315); tris-1-aziridinyl phosphine oxide, N,N'-bisethylene benzene phosphondiamides, N,N'-bisethylene benzene thiophosphondiamide, hexyl N,N'-bisethylenediamidophosphate, and N,N - dibutyl - N',N''-bisethylene phosphontriamide.

Useful polyamido ring compounds in which the aziridine ring is united to a

radical include thiophosphonic acid diamides, such as N,N'-diethylenbenzene thiophosphondiamide, as disclosed in Kuh et al. U.S. Patent 2,672,459, and O-aryl bis-aziridinyl phosphinothioates, as disclosed in Tolkmith et al. U.S. Patent 2,802,824.

Useful polyamido ring compounds in which the aziridine ring is united to a

radical include bisdimethylene thiuram polysulfides, as disclosed in Mathes et al. U.S. Patent 2,407,566.

Materials in which active hydrogen is provided by a plurality of —COOH groups and which are suitable for carrying out my invention include branched polyesters prepared from a polyfunctional alcohol, one or more diols, and one or more dibasic acids, such as the reaction product of glycerol, 2,2-dimethyl-1,3-propane diol, and succinic acid; branched polyesters prepared from a polyfunctional acid, one or more diols, and one or more dibasic acids, such as the reaction product of citric acid, polyethylene glycol, and adipic acid; branched polyesters prepared from a polyfunctional acid and a hydroxy or an amino acid, such as the reaction product of benzene tetracarboxylic acid and 12-hydroxy stearic acid or N-methyl-β-alanine; dianhydride-extended linear polyesters, such as hydroxyl-terminated polydiethylene glycol adipate extended with pyromellitic dianhydride; dianhydride-extended polyether glycols, such as the reaction product of 1,4,5,8-naphthalenetetracarboxylic dianhydride and polypropylene glycol; prepolymers prepared from branched polyether glycols and cyclic acid anhydride, such as the reaction product of propylene oxide and ethylene diamine with glutaconic anhydride; vinyl-type addition copolymers, such as copolymers of acrylic acid and butadiene; acrylate copolymers, such as copolymers of octadecyl acrylate and acrylonitrile; copolymers prepared from vinyl chloride, and maleic anhydride; and low molecular weight polymerized fatty acids of the drying oil and semi-drying oil type derived from unsaturated monomers having at least two double bonds and acyl groups, the preparation of which is disclosed in U.S. Patents 2,482,761, 2,373,015, and 2,435,478.

Materials in which the active hydrogen is provided by a plurality of —OH groups and which are suitable for carrying out my invention include polyethers such as polyethylene or polypropylene glycol having a molecular weight of from 200 to 20,000; polyvinyl alcohol and/or partially hydrolyzed polyvinyl acetate; and hydroxyl-terminated branched polyesters such as the reaction product of adipic acid, hexane triol, and butylene glycol.

Materials in which the active hydrogen is provided by a plurality of —SH groups and which are suitable for carrying out my invention include polyalkylene polysulfide prepolymers, such as liquid dimercaptans formed by reacting dichlorodiethylformal and an alkali polysulfide.

Materials in which the active hydrogen is provided by a plurality of —NH$_2$ groups and which are suitable for carrying out my invention may be made by reacting polymeric fat acids and aliphatic polyamines, as disclosed in U.S. Patents 2,450,940 and 2,705,223.

In setting forth my invention herein, I am aware of the I. G. Farbenindustrie French Patent 882,150. It discloses in fairly broad terms that paper can be "treated" with ethylene imine derivatives, with or without the addition of lower amines, mono- or polycarboxylic acids, polyacrylic acid, vinyl chloride, urea formaldehyde, abietic acid, albumens, polyethylene imine, etc., but the materials employed in this patent and the quantities in which they are applied (2–10%) clearly teach the preparation of a paper treated with relatively small amounts of hard and brittle materials and thus point away from my invention. Such treated papers are not suitable for my purposes, nor could they be made so by merely increasing the degree of "treatment."

In making the product of my invention I first immerse a water-laid fibrous sheet in a bath containing a mixture of the polyamido compound and the reactive hydrogen compound and thereafter remove the thus-saturated paper, evaporate the excess solvent, and cure the co-reactants. Preferably the saturing bath contains enough organic solvent to reduce its viscosity to 50–100 centipoises, and more importantly to lower the percent solids of the treating bath and thereby reduce the total amount of saturant picked up to 25–100% of the weight of the untreated paper; generally I employ a saturant bath made up of about 40–60% co-reactants and 60–40% solvent. Although it is usually more convenient to heat the saturated paper at temperatures of about 200° F. to quickly drive off the solvent and cure the co-reactants, in most cases room temperature conditions will accomplish both objectives in a few days.

My invention will be better understood upon reference to the illustrative but non-limitative examples set forth below.

*Example I*

This example illustrates the saturation with a "bisamide" and a polysulfide of paper similar to that conventionally saturated with latexes in preparing a backing for waterproof sandpaper.

A 100% kraft paper having a basis weight of 37 lbs. per papermakers' ream of 480 sheets 24" x 36", a caliper of 5.4 mils, a Gurley densometer value of 20 (seconds required to force 400 cc. of air through a 1.0 square inch section of 4 thicknesses of paper under a 20-ounce weight, per ASTM Test 726–58A) a machine direction tensile strength of 10.5 lbs. per inch of width at 1.4% total elongation and a crosswise tensile strength of 14.3 lbs. per inch of width at 2.7% elongation, and lengthwise and crosswise tear strengths respectively of 112 and 98 grams (for 16 thicknesses of paper, per ASTM Test D689–44), was saturated as follows: a saturant solution was separately prepared by carefully stirring into 155 grams of toluol, 62 grams of N,N'-bis-1,2-ethylene isosebacamide having an equivalent weight of 126 per amido ring, and thereafter adding 170 grams of "Thiokol LP–33" (a liquid dimercaptan formed by reacting dichlorodiethylformal and an alkali polysulfide, having a molecular weight of about 1000 and an equivalent weight of about 500 per —SH group, obtained from the Thiokol Chemical Corporation). The paper was then passed through the saturant, which had a viscosity of about 75 cps., so as to pick up approximately 17.5 lbs. of solids per papermakers' ream. The saturated paper was then hung in festoons and heated at 210° F. for 3 hours to evaporate the toluol and cure the co-reactants.

The cured saturated paper had a machine direction tensile strength of 23.5 lbs. per inch of width and a crosswise tensile strength of 11.3 lbs. per inch of width at 2.3% and 5.4% ultimate elongation respectively. After soaking in water at 70° F. for 30 minutes the lengthwise and crosswise tensile strengths were 7.8 and 4.8 lbs. respectively, while the elongations were 5.0 and 8.7%. (It is to be noted that although the unsaturated paper used in this example is fairly strong while maintained in the dry state, its wet strength is substantially zero.) The saturated sheet was 5.6 mils thick and had a Gurley densometer reading of 36 seconds for 4 thicknesses. The lengthwise tear strength was 80 and the crosswise tear strength 96 measured, as previously described, on the Elmendorf shear tester. This product has a finished basis weight of about 54.5 lbs. per ream, as compared to 48 lbs. for the latex-saturated paper commonly used as the backing for waterproof sandpaper. To compare these two saturated papers, the figures in the table below have been obtained by dividing the tensile and tear strengths by the respective basis weights and multiplying by 100.

|  | Dry Tensile | | Wet Tensile | | Tear Strength | |
| --- | --- | --- | --- | --- | --- | --- |
|  | Machine | Cross | Machine | Cross | Machine | Cross |
| Conventional latex saturated paper | 46.0 | 37.0 | 13.5 | 4.6 | 80 | 80 |
| Saturated paper of Example I | 43.2 | 20.5 | 14.3 | 8.8 | 147 | 172 |

*Example II*

Using conventional adhesives, mineral, and coating techniques the saturated and cured paper of Example I was employed as the backing sheet for waterproof sandpaper as follows: a first major surface was rendered slip-resistant by treating with a plasticized polyvinyl acetate latex, while the second surface was sized with a terpolymer latex of butadiene:styrene:acrylonitrile. After drying, an alkyd resin "make" adhesive was coated on the second sized surface, and grade 320 silicon carbide granules electrostatically applied. The alkyd resin was then heat-cured and a phenolic resin sandsize adhesive applied. The phenolic resin was then heat-cured. In hand sanding operations this material cut automotive surfacer at least as rapidly as conventional sandpaper while showing a greatly reduced tendency to snag and tear.

*Example III*

This example illustrates the saturation of paper with a "bis-amide" and a polybasic unsaturated fatty acid.

A saturated paper was prepared using as the base Premoid "1020," a conventional saturating paper for use with latexes, having a basis weight of 44.5 lbs. per papermakers' ream, a caliper of 6.7 mils, a machine direction tensile strength of 4.4 lbs. per inch at 1% elongation and a crosswise tensile strength of 3.0 lbs. per inch at 2.1% elongation, lengthwise and crosswise tears of 72 and 64 grams respectively, and a 4-thickness Gurley densometer reading of 6 seconds. This paper is typical of those used for latex saturation, and it will be noted that even though the paper weight is relatively high, the tensile strength is relatively low. The paper is extremely open and subject to tearing when used with aqueous emulsions.

A saturant bath was prepared by blending 144 grams of toluol, 73 grams of N,N'-bis-1,2-ethyleneisosebacamide, and 140 grams of Emery trimer acid "3130R" (a C-54 tribasic acid trimer of linoleic acid having an average molecular weight of about 845 and an equivalent weight of 310 per —COOH group). The paper was then passed through the saturant bath, which had a viscosity of about 70 centipoises, so as to apply approximately 33.4 lbs. of saturant solids per papermakers' ream, after which the saturant was polymerized in situ by heating for 3 hours at 210° F. The finished sheet had tensile strengths of 22.5 lbs. at 7.2% elongation and 17.6 lbs. at 11.4% elongation in the machine and crosswise directions respectively. After soaking in water for 30 minutes at 70° F., the corresponding tensile figures were 14.9 lbs. at 12.7% and 10.5 lbs. at 20.0% elongation. The caliper of the saturated paper was 7 mils, and the 4-thickness Gurley densometer reading was 20 seconds. The lengthwise and crosswise tear figures were respectively 78 and 76 grams.

When presized with a terpolymer latex of butadiene:acrylonitrile:styrene and backsized with polyvinyl acetate, this paper was used as the backing for waterproof sandpaper. The performance was substantially similar to that of the product of Example II.

*Example IV*

This example illustrates the saturation of paper with a "bis-amide" and a linear carboxyl-terminated polyester.

A dense paper made from 25% rope and 75% kraft paper fibers and entirely unsuitable for conventional latex saturation was used as a saturating paper as subsequently described in this example. This paper had a machine direction tensile strength of 25.3 lbs. at 2.1% elongation and a crosswise tensile strength of 12.3 lbs. at 4.3% elongation. The 4-thickness Gurley densometer reading was 100 seconds and the caliper was 4.9 mils. Tear strengths were respectively 94 and 100 in the lengthwise and crosswise directions. The basis weight of this paper was 38 lbs. per papermakers' ream.

To 226 grams of toluene was added 33 grams of N,N'-bis-ethylenisosebacamide and 193 grams of a carboxyl-terminated polyester having a molecular weight of about 2,000 and an equivalent weight of 950 per —COOH group, prepared by reacting 6 mols of ethylene glycol, 6 mols of 1,4-butanediol and 13 mols of adipic acid. The paper was then passed through the saturant bath, which had a viscosity of 70 centipoises, so as to pick up 16 lbs. of solid reactants per papermakers' ream. The solvent was evaporated and the saturated paper cured by heating for 2½ hours at 250° F. The finished product had a machine direction tensile strength of 34.1 lbs. at 2.9% elongation and a cross tensile strength of 17.5 lbs. at 6.5% elongation. After soaking in water for 30 minutes at 70° F. the respective tensile strengths and elongations were 15.2 lbs. at 5.4% and 5.7 lbs. at 9.0%. The 4-thickness Gurley densometer reading was 154 seconds, and the ultimate caliper was 5.0 mils. The lengthwise and crosswise tear strengths were respectively 72 and 92.

When made into waterproof sandpaper as in Example II, this paper had outstanding wet strength retention at a relatively low degree of saturation. It cut longer and faster than conventional products while maintaining extremely high resistance to cracking, tearing, or snagging.

*Example V*

This example illustrates the saturation of the fairly dense paper used in Example IV with a carboxyl-terminated polyester and a bis-alkylene carbamate.

One thousand grams of a hydroxyl-terminated polyester made from diethylene glycol and adipic acid, having a hydroxyl number of 35–45, and acid number of less than 3, and a viscosity of 750 centipoises, was reacted with 50 grams of pyromellitic dianhydride to form a carboxyl-terminated polyester having a molecular weight of about 7400 and an equivalent weight of 1480 per —COOH group. To 114 grams of toluene was added 148 grams of the 80% solids polyester just described and 25.2 grams of 2,2-bis-p-(β-N-ethylene carbamato - β - methyl phenetyl) propane, having an equivalent weight of 241 per amido ring. After mixing the reactants thoroughly, a sample of the same paper used in Example IV was passed through a bath of the reactants so as to pick up 18.3 lbs. of saturant solids per papermakers' ream. The solvent was evaporated and the saturant materials co-reacted by heating for 2½ hours at 210° F. The resulting paper had a machine direction tensile strength of 30.1 lbs. per inch at 2.8% elongation and a crosswise tensile strength of 13.3 lbs. at 5.3% elongation. After soaking the paper for 30 minutes in water at 70° F., the respective tensile and elongation figures were 9.2 lbs. at 4.5% and 4.3 lbs. at 7.3%. The paper was rendered extremely dense, having a 4-thickness Gurley densometer reading measured as described in previous examples of 12,273 seconds. Lengthwise and crosswise tear values were respectively 72 and 104, and the caliper of the finished product was 4.7 mils. Although this paper was useful for making waterproof sandpaper having good cut and tear resistance, the saturant is quick-gelling and requires care in handling.

*Example VI*

This example illustrates the saturation of a paper with materials in which one of the co-reactants is a derivative of phosphonic acid.

Carboxyl-terminated material having a molecular weight of about 1800 and an equivalent weight of about 650 per —COOH group and obtained by reacting (1) 40 parts of a carboxylated material made by reacting 1 mole of 2,2-bis-(β-hydroxy-β-methyl phenetyl) propane and 2 moles of maleic anhydride adduct of methyl cyclopentadiene ("Methyl Nadic anhydride," obtained from the National Aniline Division of the Allied Chemical and Dye Corporation) and (2) 20 parts of a neopentyl glycol: trimethylol propane:adipic acid polyester (acid No. 60) in 27.7 parts of butylacetate and 13.3 parts of methylethylketone solvent, was cured with 14.1 parts of a 75% solution in ethanol of tris-1-aziridinyl phosphine oxide having an equivalent weight of 59 per amido ring ("APO"). 21.2 lbs. per papermakers' ream of the aforementioned saturant was added to a 29.8 lb. paper which had a machine direction tensile strength of 7.9 lbs. per inch of width and a cross tensile strength of 6.5 lbs.; a tear resistance of 54 grams in the machine direction and 58 grams in the cross direction; and a caliper of 3.2 mils. After curing 45 minutes at 100° C. the paper had tensile strengths of 18.9 and 14.7 lbs. in the machine and cross direction respectively, and tear resistances of 34 and 40 in the machine and cross directions respectively. This paper performed satisfactorily as a waterproof sandpaper backing, although it was somewhat more brittle than the products of preceding examples.

*Example VII*

This example illustrates the saturation of paper with materials in which one of the co-reactants has active hydrogen sites which are secondary amine groups.

To 220 grams of ethylene glycol monoethyl ether was added 75 grams of N,N'-bis-ethylenosebacamide and 136 grams of "Versamid 125" and the resulting materials carefully blended. ("Versamid 125," supplied by General Mills, is an amine-terminated polyamide resin made by reacting polymeric fat acids and aliphatic polyamines. It has a room temperature viscosity of about 50,000 cps. and an amine value of about 184 grams of resin per amine group. Resins of this type are described in U.S. Patents 2,450,940 and 2,705,223.) The paper used in Example IV was saturated by immersing it in this treating bath, which had a viscosity of about 80 centipoises, so as to pick up about 14.8 lbs. of solid co-reactants per papermakers' ream. Solvent was then evaporated and the reaction completed by heating for 3 hours at 210° F., the paper then having a thickness of 5.0 mils and a 4-thickness Gurley densometer reading of 424 seconds. The resulting saturated paper had a machine direction crosswise tensile strength of 38.8 lbs. at 3.7% elongation and a crosswise tensile strength of 18.8 lbs. at 6.5% elongation. The lengthwise and crosswise tear strengths were respectively 60 and 72. After soaking for 30 minutes in water at 70° F., the tensile strengths were respectively 16.6 lbs. at 5.0% elongation and 4.8 lbs. at 7.3% elongation. Although this paper had a slight tendency toward brittleness, it was suitable for the manufacture of waterproof sandpaper.

*Example VIII*

This example illustrates the saturation of paper with materials in which one of the co-reactants contains two primary amine groups per molecule.

To 130 grams of toluol was added 32 grams of N,N'-bis-ethyleneisosebacamide, 32 grams of N,N'-bis-ethyleneisophthalamide having an equivalent weight of 108 per amido ring, and 130 grams of "3154R" (a C-36 diprimary amine having a molecular weight of about 560 and an equivalent weight of 320 per amine group, supplied by the Emery Industries Co.). The resulting mixture, which had a viscosity of 70 centipoises, was used to saturate paper of the same type used in Example III, the total pick up being 30 lbs. of solid co-reactants per papermakers' ream. The solvent was evaporated and the saturant cured by heating 3 hours at 210° F., the resulting paper having a caliper of 7.0 mils and a 4-thickness Gurley densometer reading of 20 seconds. The tensile strength in the machine and cross direction were respectively 25.6 lbs. at 5.8% elongation and 21.0 lbs. at 8.6% elongation. Lengthwise and crosswise tear values were respectively 78 and 72. After soaking in water for 30 minutes at room temperature, the tensile strengths and elongations were respectively 13.2 lbs. at 12.5% in the machine direction and 12.3 lbs. at 17.3% in the cross direction. This paper was entirely satisfactory for the manufacture of waterproof sandpaper.

*Example IX*

This example illustrates the saturation of paper with co-reactants in which the reactive hydrogen-bearing compound is a branched polyester.

To 154 grams of toluene was added 32 grams of N,N'-bis-1,2-propyleneisophthalamide having an equivalent weight of 112 per amido ring and 194 grams of a branched polyester prepared by reacting 1.0 mol of isosebacic acid, 0.838 mol of neopentyl glycol, and 0.0485 mol of trimethylol propane, the resulting product having an acid number of 58, a molecular weight of about 2,000, and an equivalent weight of 970 per —COOH group. After the co-reactants had been mixed thoroughly, the reactant bath had a viscosity of 70 centipoises. Paper identical to that used in Example IV was then saturated by passing it through this bath so as to pick up 19.7 lbs. of solid material per papermakers' ream. The solvent was evaporated and the co-reactants cured by heating for 2 hours at 210° F. and 3 hours at 250° F. The saturated paper had a caliper of 4.9 mils and a 4-thickness Gurley densometer reading of 320 seconds. The tensile strength was 17.2 lbs. at 2.4% elongation in the machine direction and 12.1 lbs. at 4.6% elongation in the cross direction. Lengthwise and crosswise tear values were respectively 82 and 102. After soaking for 30 minutes in room temperature water, the wet tensile strength was 4.1 lbs. at 2.7% elongation in the machine direction and 2.0 lbs. at 5.1% elongation in the crosswise direction. Although somewhat less resistant to extended soaking than the papers of the preceding examples, this product had extremely high tear resistance and proved quite useful in the manufacture of waterproof sandpaper.

*Example X*

This example illustrates the use of a bis-amido co-reactant in which the amido ring has an alkyl substituent.

To 123 grams of toluene was added 28 grams of N,N'-bis-1,2-propyleneisosebacamide having an equivalent weight of 130 per amido ring, and 151 grams of the carboxyl-terminated polyester disclosed in the preceding example. The ingredients were carefully mixed, the resulting viscosity being 70 centipoises. The co-reactant bath was then used to saturate a paper closely resembling that of Example I, having a basis weight of 37 lbs. per papermakers' ream, a caliper of 5.8 mils, a 4-thickness Gurley densometer reading of 14 seconds, machine and cross tensile strengths respectively of 13.9 lbs. at 1.9% elongation and 5.1 lbs. at 3.8% elongation, and lengthwise and crosswise tear values of 122 and 160. The saturation was carried out so that the total solids pickup was about 27 lbs. per papermakers' ream. The solvent was evaporated and the co-reactants cured by heating for 3 hours at 250° F., after which the paper had a caliper of 5.7 mils and a 4-thickness Gurley densometer reading of 60 seconds. The tensile strengths in the machine and cross directions were respectively 17.2 lbs. at 2.5% elongation and 5.0 lbs. at 4.4% elongation. Lengthwise and crosswise tear values were outstanding, being respectively 140 and 168. After the paper had been soaked for 30 minutes in room temperature water, the respective machine and cross tensile figures were 4.2 lbs. at 5.0% elongation and 1.7 lbs. at 13.0% elongation. Although the rate of reaction of the saturant components was relatively slow, this product was used to make satisfactory waterproof sandpaper.

*Example XI*

This example illustrates the use of a hydroxyl-terminated polyester as the reactive hydrogen-bearing co-reactant employed as a paper saturant according to the invention.

"Hurlbut 720–B" paper, which is a bleached high alpha cellulose content paper having a basis weight of 29.8 lbs., a thickness of 3.2 mils, machine and cross tensile strengths of 7.9 and 6.5 lbs. respectively, and machine and cross tear strengths of 54 and 58 respectively, was saturated as follows: the paper was passed through a 50% solids (by weight) solution in toluol of 25 parts of Mobay "Multron R–10" (a moderately branched hydroxyl-terminated polyester, formed by reacting adipic acid, hexane triol, and butylene glycol, having an —OH number of 208, a molecular weight in excess of 540, and an equivalent weight of 263 per —OH group), 12.8 parts of N,N'-bis-ethylenisophthalamide, and 0.5 part of dimethylbenzylamine, and then drawn between two stationary rolls spaced 5.0 mils apart, a total of 9.6 lbs. of solid saturant being applied per ream. The paper was then heated at 120° C. for 15 minutes to evaporate the solvent and cure the co-reactants. A tackfree saturated paper was obtained which exhibited unusually high transparency and excellent write-on qualities without any appreciable loss of flexibility or strength.

The example set forth above describes co-reactants which are applied from toluol solutions and which have viscosities in the range of 50–100 centipoises. If desired, many co-reactants can be mixed together directly to provide a treating bath containing no volatile material and having a viscosity of perhaps 2500 centipoises. Where it is desired to achieve a fairly high degree of saturation, e.g., on the order of an amount equal to or greater than the weight of the paper, I may employ treating baths of this type. As is to be expected, the pot life of a 100% solids-containing bath is somewhat less than a corresponding bath which contains solvent.

As has been indicated, the saturated paper products of my invention preferably contain at least two 1,2-alkylene amido rings (supplied by the first material) for every molecule of the second material. If a substantially lower number of amido rings, e.g., 1.5 per molecule, are present, the saturated papers tend to be tacky and stretchy, or to have low tensile strength and poor water resistance. This phenomenon is apparently caused by insufficient chain extension and cross linking of the co-reactants. Similarly, the saturated paper products of my invention preferably do not contain more than two 1,2-alkylene amido rings for every reactive hydrogen-bearing group (supplied by the second material). If a substantially greater number of amido rings, e.g., 4 per active hydrogen-bearing group, are present, the saturated papers tend to become stiff and brittle, having low strength and poor tear-resistance.

If desired, fillers can be added to the saturant baths used in this invention, as well as dyes or other substances which may be considered as adjuvants and the like; for example, accelerators, antioxidants, and catalysts. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g., addition of increased amounts of polyamido co-reactants).

What I claim is:

1. An easily and controllably prepared sheet material having excellent dry and wet strength, comprising a paper sheet saturated with and reinforced by an intimately fiber-contacting flexible tackfree solid resinous saturant polymer in an amount equal to at least about 25% of the weight of said paper sheet, said polymer comprising the in situ-reacted product of (1) an N-ethylene phosphon-polyamide and (2) a second organic compound having at least two reactive hydrogen-bearing groups per molecule and a large number of hydrogen atoms which are not reactive, said second compound having a molecular weight equal to at least about 100 times the number of said reactive hydrogen-bearing groups per molecule, said paper sheet being additionally provided with a coating differing in composition from said saturant polymer.

2. An easily and controllably prepared sheet material having excellent dry and wet strength, comprising a paper sheet saturated with and reinforced by an intimately fiber-contacting flexible tackfree solid resinous saturant polymer in an amount equal to at least about 25% of the weight of said paper sheet, said polymer comprising the in situ-reacted product of (1) a first organic compound having at least two 1,2-alkylene amido rings per molecule and (2) a dimercaptan having a molecular weight of at least about 200, said paper sheet being additionally provided with a coating differing in composition from said saturant polymer.

3. The sheet material of claim 1, wherein said coating is a composition bonding abrasive grains to said paper sheet.

4. The sheet material of claim 2, wherein said coating is a composition bonding abrasive grains to said paper sheet.

References Cited by the Examiner

UNITED STATES PATENTS

| | | | |
|---|---|---|---|
| 2,692,253 | 10/1954 | Holmen | 117—122 |
| 2,848,105 | 8/1958 | Bartell et al. | 117—122 |
| 2,893,854 | 7/1959 | Rinker et al. | 117—28 |
| 2,915,480 | 12/1959 | Reeves et al. | 117—155 X |

FOREIGN PATENTS 882,150  5/1943  France.

WILLIAM D. MARTIN, *Primary Examiner.*

RICHARD D. NEVIUS, *Examiner.*